United States Patent [19]

Ayers et al.

[11] Patent Number: 4,757,245
[45] Date of Patent: Jul. 12, 1988

[54] CONTROL SYSTEM FOR A PLURALITY OF STEPPER MOTORS

[75] Inventors: David A. Ayers, Buffalo Grove; John F. Dumelle, Arlington Heights, both of Ill.

[73] Assignee: Merit Machined Products, Chicago, Ill.

[21] Appl. No.: 1,784

[22] Filed: Jan. 8, 1987

[51] Int. Cl.⁴ .............................................. G05B 19/40
[52] U.S. Cl. ..................................... 318/685; 318/696
[58] Field of Search ............... 318/685, 696, 603, 579, 318/632, 7, 8; 307/11, 38

[56] References Cited

U.S. PATENT DOCUMENTS

| | | | |
|---|---|---|---|
| 3,146,386 | 8/1964 | Gerber | 318/8 |
| 3,268,785 | 8/1966 | Gerber et al. | 318/8 |
| 3,317,802 | 5/1967 | Ogden | 318/102 |
| 3,372,568 | 3/1968 | Lemelson | 72/218 |
| 3,416,053 | 12/1968 | Inaba et al. | 318/103 |
| 3,416,054 | 12/1968 | Galles | 318/696 |
| 3,486,093 | 12/1969 | McArthur | 318/102 |
| 3,497,778 | 2/1970 | Gerber | 318/8 |
| 3,555,254 | 1/1971 | Gerber | 318/632 |
| 3,757,192 | 9/1973 | Asano et al. | 318/696 |
| 3,763,360 | 10/1973 | Nishimura et al. | 318/603 |
| 3,983,374 | 9/1976 | Sorensen, III et al. | 318/579 X |
| 4,055,786 | 10/1977 | DiMarzio | 318/562 |
| 4,277,731 | 7/1981 | Pongracz | 318/683 |
| 4,401,931 | 8/1983 | Kulterman et al. | 318/696 |
| 4,514,673 | 4/1985 | Sfarti | 318/685 |

Primary Examiner—William M. Shoop, Jr.
Assistant Examiner—Saul M. Bergmann
Attorney, Agent, or Firm—Niro, Scavone, Haller & Niro, Ltd.

[57] ABSTRACT

An apparatus and method for operating a plurality of stepper motors. A controller operates a plurality of sequentially connected stepper motors executing substantially the same motion. The apparatus includes an incremental control feature for generating an alignment signal to step an associated motor a predetermined amount. Once the alignment of all the motors is done all the motors are moved with substantially the same motion.

21 Claims, 6 Drawing Sheets

CONTROL SYSTEM FOR A PLURALITY OF STEPPER MOTORS

BACKGROUND OF THE INVENTION

The present invention relates generally to an apparatus and method for operating a plurality of stepper motors for performing selected machining and/or positioning functions. More particularly, the invention relates to a system having only one controller operating a plurality of sequentially connected, or electronically chained, stepper motors generating substantially the same motion.

Automatic control of machining operations has undergone significant advances involving systems using computer control of a number of sophisticated machining apparati. Such systems, however, tend to be constructed of complex, expensive components which are intended to execute sophisticated routines and/or a number of independent simultaneous operations. These complex systems are not well suited or economical choices for carrying out repetitive and routine machining and/or positioning operations.

It is therefore an object of the invention to provide an improved system for controlling a plurality of stepper motors.

It is another object of the invention to provide a novel control system using one controller to synchronously operate a plurality of stepper motors in substantially identical motion.

It is an additional object of the invention to provide an improved control system for operating a sequentially connected, or electronically chained, plurality of stepper motors.

It is a further object of the invention to provide a novel control system and coupled plurality of stepper motors, each motor adapted for selective alignment relative to the other motors.

A feature in accordance with the instant invention lies in a system for controlling a plurality of stepper motors including a control means for generating a control signal and a plurality of drive signal means responsive to the control signal for generating electrical drive signals, the control means coupled to a first one of the plurality of drive signal means and additional ones of the drive signal means sequentially controlled, or electronically chained, to the first one, enabling output of substantially the same control signal to each of the plurality of drive signal means.

In another aspect of the invention the system can further include incremental means, such as rotary jog means, for generating an alignment signal to an associated one of drive signal means, the alignment signal stepping each associated one of the stepper motors a predetermined amount. The system is also adapted for selectively enabling or disabling each of the drive signal means, such as by an on/off switch on the drive signal means.

In a further aspect of the invention, a complete apparatus for controlled execution of a plurality of substantially identical machining tasks includes the control system and an input means for providing program signals to execute a desired program using the control system. The complete apparatus also includes motor means and indexer means for executing a measurable selected spatial movement of a machining and/or positioning operation.

Further objects and advantages of the present invention, together with the organization and manner of operation hereof will become apparent from the following detailed description drawings wherein like reference numerals designate like elements throughout the several views.

DETAILED DESCRIPTION OF THE PREFERRED EMBODIMENT

Figure 1:
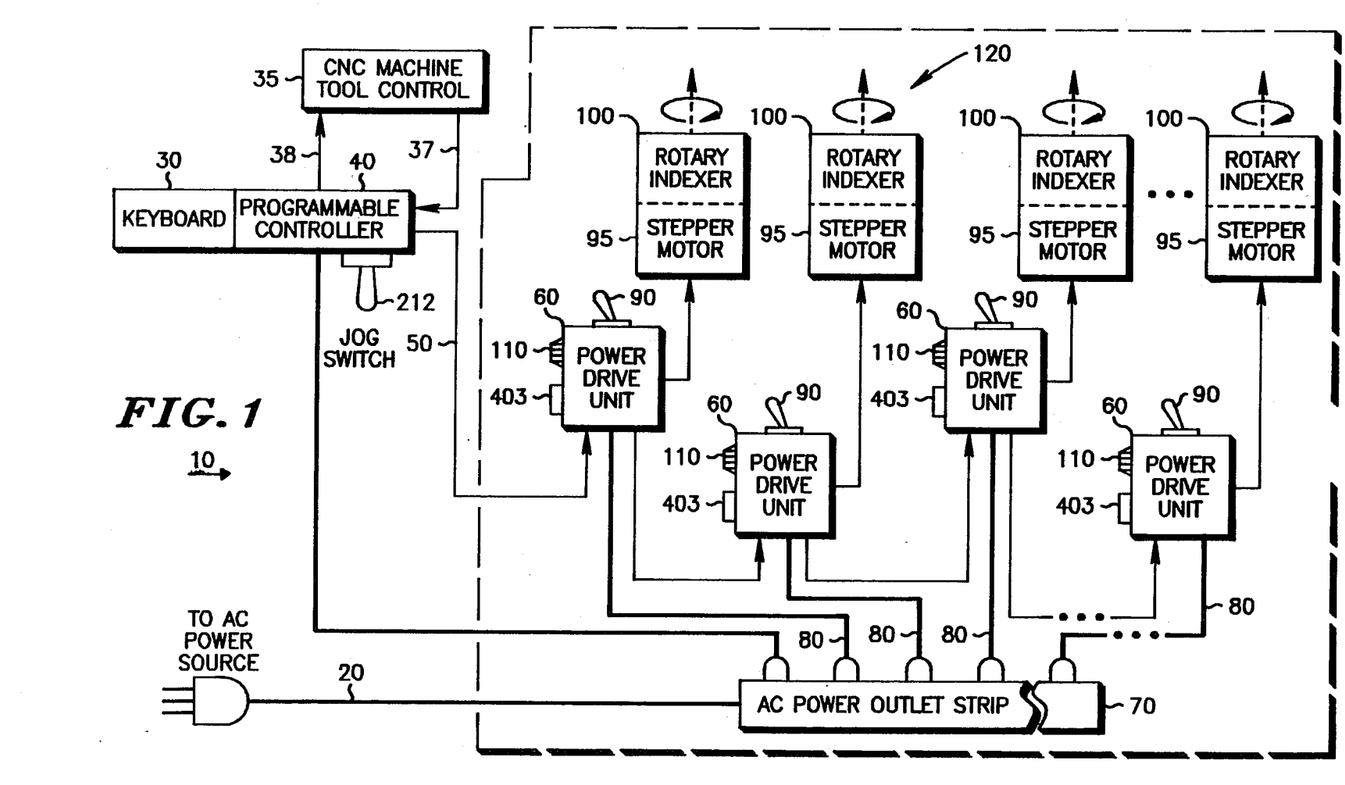
FIG. 1 is a component diagram of an apparatus for controlled execution of a machining and or positioning task by a plurality of stepper motors.

Referring now to the drawings and in particular to FIG. 1, an improved machining apparatus and control system constructed in accordance with one embodiment of the present invention is indicated generally at 10. Power to the machining apparatus 10 is provided by conventional one hundred ten or two hundred twenty VAC input along power cord 20. Basic control of the machining apparatus originates with an input means, such as a conventional keyboard 30, providing program signals to control means such as a programmable controller 40. A machine tool control 35, such as a conventional CNC (computer numerically controlled) machine tool, provides a cycle start signal 37 to the programmable controller 40 which in turn provides a cycle complete signal 38 to the tool control 35 at the end of the desired task. The programmable controller 40 generates a control signal responsive to the program signals, and the control signal is carried by a signal cable 50 to a first one of a plurality of drive means, such as a power drive unit 60. The control signal is "daisy chained", or sequentially connected or electronically chained, to additional ones of the power drive unit 60, enabling input of substantially the same control signals to the plurality of power drive units 60. Consequently, the one programmable controller 40 synchronously controls the plurality of power drive units 60 which perform substantially identical machining tasks. Electrical power for the power drive units 60 is provided from an A.C. power strip 70 through power cables 80. Each of the power drive units 60 can selectively be enabled or disabled by a user by means of an on/off switch 90 associated with each of the power drive units 60.

Each of the power drive units 60 responds to the control signal to generate electrical drive signals to operate stepper motors 95. Therefore, programmable controller 40, through the control signal output to the power drive units 60, determines the nature, such as the extent of spatial movement of a rotary indexer 100 coupled to each of the stepper motors 95. The programmable controller 40 is a commercially available unit, such as for example, a Haas-5C made by Haas Automation, Sun Valley, Calif..or a Richmill RICH-1X5C made by Richmill Manufacture Company, Ltd. Tokyo, Japan. The process of generating the control signal information also includes generating the cycle start signal 37 from the machine tool control 35. The cycle start signal 37 is input to the programmable controller 40 to start the machining and/or positioning. Once machining and/or positioning has been completed, a completion of task signal is returned to the machine tool control 35 from the programmable controller 40.

The apparatus 10 can generally be broken down to components 120 mounted on the machining/positioning apparatus 10, and the remaining elements affixed elsewhere. For example, for the machine tool control 35 the components 120 are on an X-Y translation table (not shown); and the programmable controller 40 and the components 120 are coupled by a flexible cable, such as the signal cable 50.

Figures 2, 6:
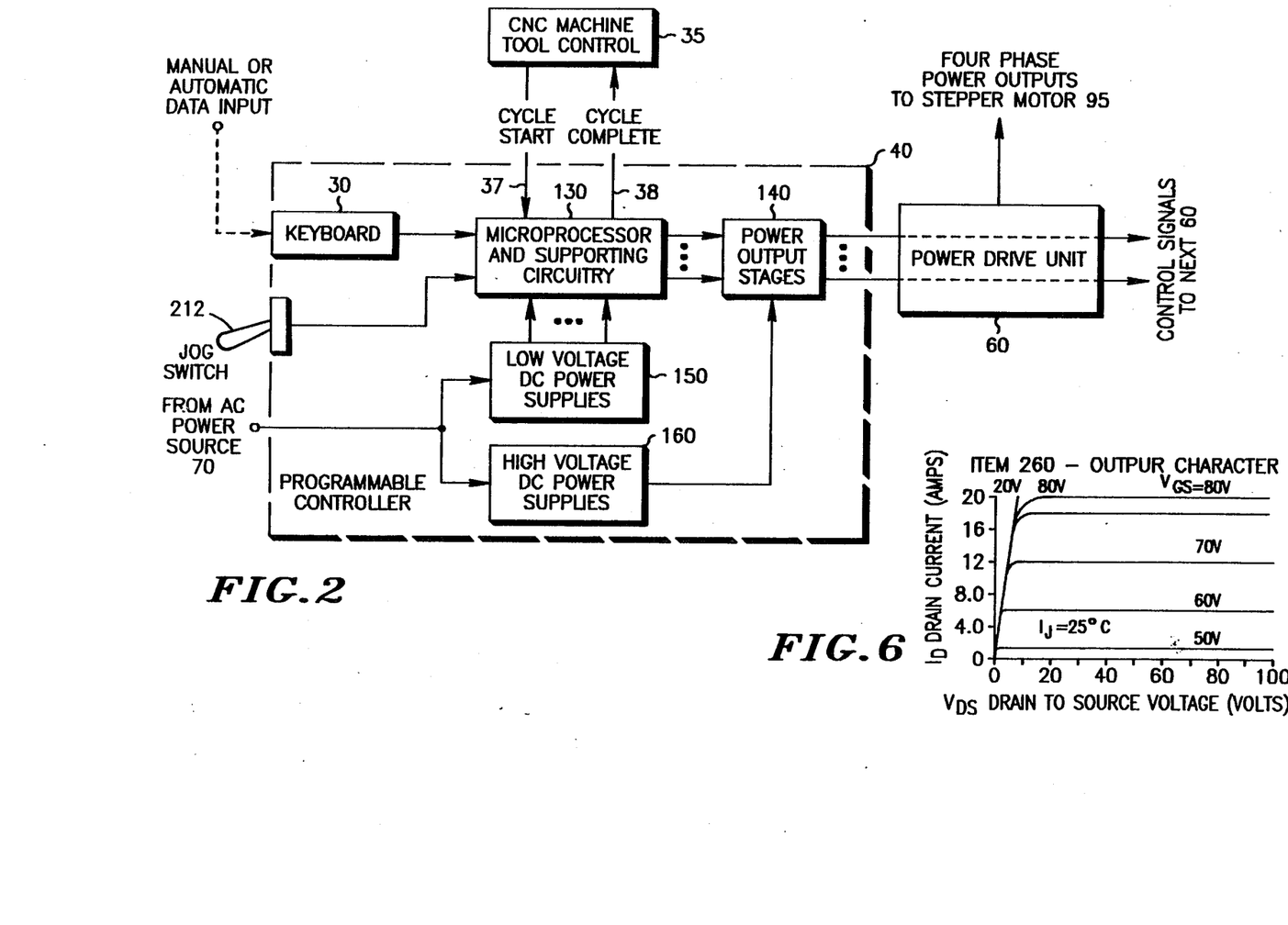
FIG. 2 is a component block diagram of a controller.
FIG. 6 is an electrical output performance curve for a power transistor.

FIG. 2 illustrates details of a typical form of the programmable controller 40. The keyboard 30 provides program signals which are input to a microcomputer 130, such as a Zilog Z-80 based system, comprising a Z-80 microprocessor, random access memory and other essential elements. In the case of generating rotary motion, the program signals typically include the following information: (a) the required direction of rotation, (b) the angle of rotation for each step in a user selected program and (c) the desired acceleration and deceleration rates for all motor movements. The microcomputer 130 receives an initiation signal from the machine tool control 35 and outputs a completion signal after terminating the prescribed task, such as completion of the desired rotational movement.

A signal output component 140 provides control signals to a first one of the power drive units 60 and then is output to the sequentially connected, or electronically chained, others of the power drive units 60. Typically the control signals are input as four separate signals to the four motor windings (not shown) of a power drive unit 60, resulting in a four phase power output to stepper motor 95 to perform the desired tasks. Power to the microcomputer 130 and the signal output component 140 is provided by low voltage supplies 150 and high voltage supply 160, respectively.

Figure 3:
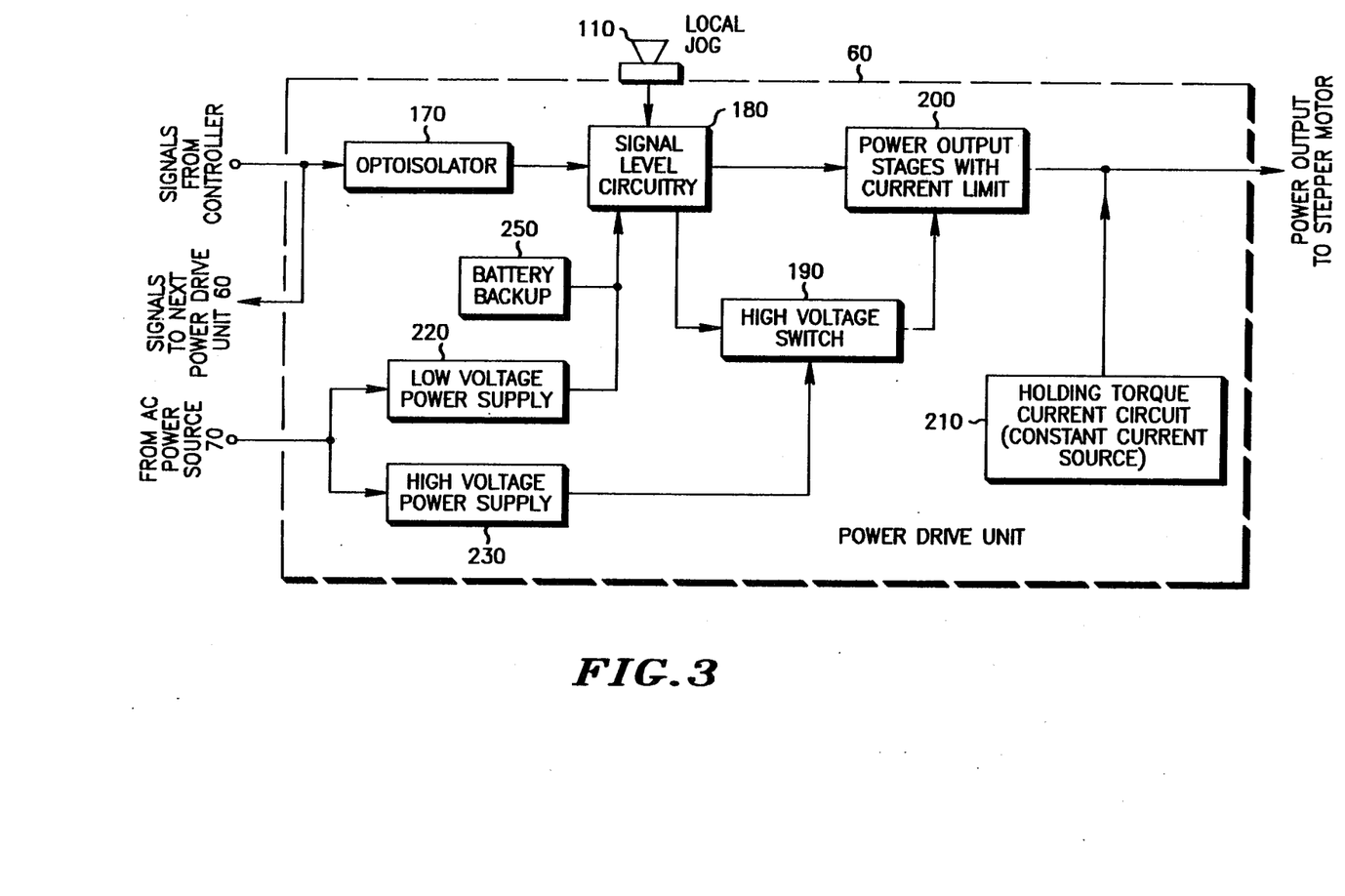
FIG. 3 is a component block diagram of a power drive unit.

The control signals from the signal output component 140 are input to the power drive unit 60 shown in detail in FIG. 3. Optoisolators 170 (such as a 4N35) receive the input to electrically isolate the control signals to avoid ground loop noise problems. Signal level element 180, high voltage switch 190 and power output stage component 200 process the control signals to generate electrical drive signals. The high voltage switch 190 is actuated when the control signals from the programmable controller 40 command motion. The switch 190 turns off and a holding torque current component 210 is enabled to provide a holding torque current at the desired position attained by each of the stepper motors 95 when the programmable controller motion commands cease. Typically, at set up the programmable controller 40 through a controller job switch 212 (see FIG. 1) enables an incremental jog of the same amount for each of the programmable drive units 60. Subsequently, an alignment component 110 (a switch knob) on each of the power drive units 60 provides an alignment signal to the signal level element 180 to adjust the position individually of each of the stepper motors 95. The power drive unit 60 also includes signal low voltage source 220 providing voltage to the signal level element 180 and motor voltage source 230 providing voltage to the stepper motor 95 through power output stages 200. The signal level voltage source can also call upon a battery back up source 250, such as a long life lithium battery or Ni-Cd rechargeable batteries, in order to maintain positional memory during power down periods.

Figures 4A, 4B:
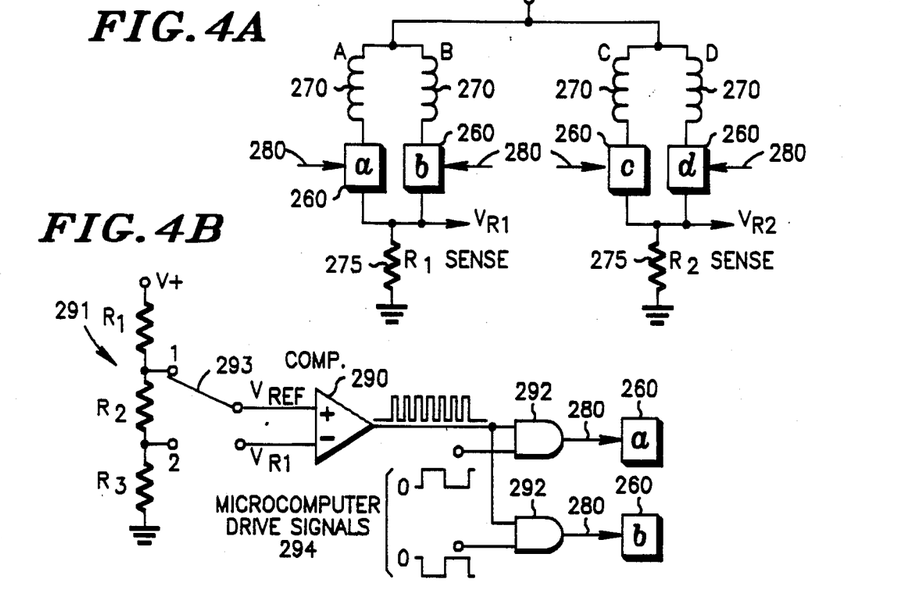
FIG. 4A shows circuit components of a conventional stepper motor drive output stage along with the motor windings.
FIG. 4B shows a conventional method of achieving current limiting.

The power drive units 60 include an important current limiting feature in the power output stage component 200 of FIG. 3 which is utilized to advantage in the instant invention. An understanding of this current limiting feature can best be appreciated by first considering the prior art illustrated in FIGS. 4A and 4B. A typical interface between the power drive unit 60 and the four phase stepper motor 95 includes a power transistor 260 associated with each of four motor windings 270 and a current sensing resistor 275 (typically 0.1 ohms) across which a voltage $V_r$ is developed. The power transistors 260 are selectively enabled/disabled by an input 280 from the programmable controller 40. FIG. 4B shows a comparator element 290 having inputs of $V_r$ and a reference voltage $V_{ref}$ and current drawn through the current sensing resistor 275 is used to limit the current in the power transistors 260 and consequently in the motor windings 270. The reference voltage $V_{ref}$ is determined by various signal level circuitry, such as the programmable controller 40. The current limiting circuitry for the remaining motor windings 270 having voltage $V_r$ is identical to the circuitry on the left side of FIG. 4A.

Figure 4C:
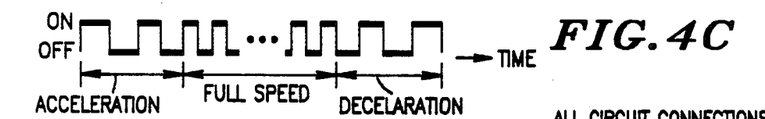
FIG. 4C is an idealized wave train for starting and stopping a stepper motor.

In FIG. 4C is shown an idealized waveform across each of the motor windings 270 of FIG. 4A for the acceleration, full speed and deceleration parts of movement of the rotary stepper motors 95. Assuming the waveform shown is across the motor winding 270 on the far left, then the waveform for the second from left motor winding 270 would be the complement of FIG. 4C. Likewise, the waveform across the motor windings 270, third and fourth from the left in FIG. 4A, would be the complement of each other and the phase would lead or lag (depending on direction of rotation) the waveforms across the first and second motor windings by 90°. In the acceleration and deceleration portions of operation, the cycles are longer in order to allow the rotor of the stepper motors 95 to increase to full speed, or to brake, respectively. Since this is an open loop system, every desired movement of the stepper motors 95 must be executed precisely or substantial inaccuracy will result in the machining and/or positioning tasks.

Figure 4D:
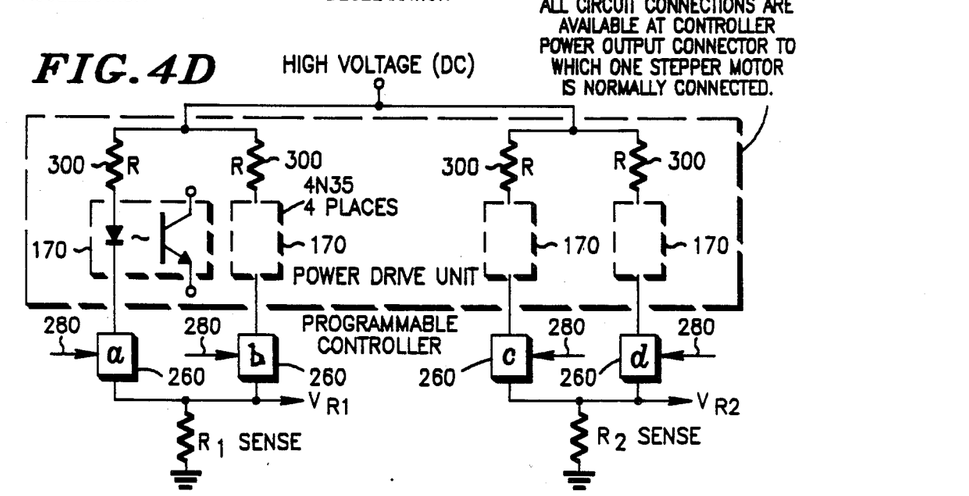
FIG. 4D shows the interfacing of power drive unit with the programmable controller.

Previously in order to avoid drawing excessive current during acceleration and deceleration (as a consequence of the stepper motors 95 being unable to develop sufficient counter EMF at low speeds) the current limiting circuitry shown in FIGS. 4A and B has been used. As a consequence, the idealized waveform of FIG. 4C is substantially changed. In the instant invention, the idealized waveforms of FIG. 4C can be obtained along with the necessary current limiting capability. As shown in FIG. 4D, the optoisolator 170 (also shown functionally in the block diagram of FIG. 3) and a resistor 300 (typically several thousand ohms) are inserted in place of the motor windings 270. These additional circuit components effectively eliminate the need for conventional current limiting capability since the current levels through the resistor 300 are reduced from amperes to milliamperes. Therefore, the voltages across the current sensing resistor 275 never become large enough to trigger the comparator element 290. The idealized waveform of FIG. 4C is recovered and the phase information, acceleration and deceleration rates and the correct number of steps of movement are utilized to accomplish precision motion of the stepper motors 95 in accordance with the control signals.

Figure 5:
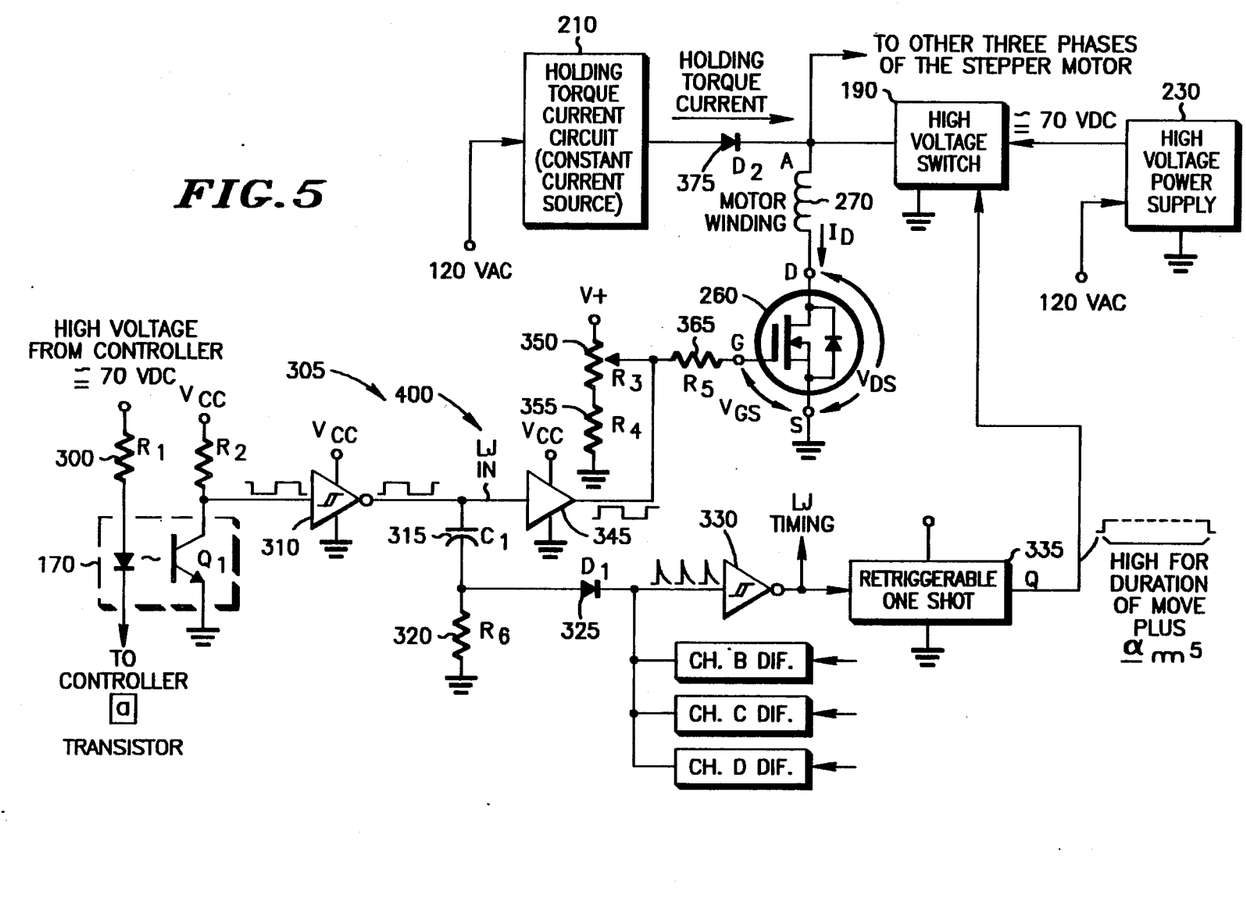
FIG. 5 is a circuit diagram of the circuitry of one phase portion of a power drive unit.

The current limiting capability during acceleration and deceleration of the stepper motors 95 is recovered for this embodiment in the manner illustrated in FIG. 5. Only one phase portion, or one channel 305, of the four is shown since they are all identical. Selected elements are also shared by all four phase portions, and these will be identified during the following discussion. The control signal from the programmable controller 40 is input to the resistor 300 and the optoisolator 170. The output from the optoisolator 170 is input to an inverter gate 310, such as a 7414 which is also a Schmitt trigger, in order to sharpen the waveform rise and fall times. The inverted signal is output and split into two circuit paths. Along the lower circuit path the signal is input to a differentiator which includes a capacitor 315, resistance 320 and diode 325. The resulting processed signal is combined with the same processed signal from the other three phase portions of the other power drive units 60. The combined signal is input through a shared inverter 330 to the trigger terminal of a shared multivibrator 335, such as a 74122. When triggered by a pulse train, the output from the multivibrator 335 will remain high ("1") state until a brief, adjustable period (typically a few milliseconds) after the last pulse has been received. A shared high voltage switch 190 is actuated when the first processed signal associated with the control signal has been received from any of the four phase portions 305, and remains on until a few milliseconds after the last pulse associated with the end of motion is received. Consequently, a high voltage output to the motor winding 270 is present only when there is motion.

The output from the inverter 310 is also input to an upper circuit in FIG. 5 to a gate 345, such as a 7417, which has an open collector output which enables control of voltages up to 15 volts while its circuitry operates on the standard five volts D.C. The gate 345 is used in association with the voltage denoted V+ and, a potentiometer 350 and resistor 355 can set the gate to source drive voltage $V_{gs}$ of a power transistor 260, such as a MOSFET power transistor. The electrical output performance characteristics of the power transistor 260 are shown in FIG. 6. The drain current ($I_d$) can be limited with a broad range of drain to source voltage ($V_{ds}$) by choosing the appropriate gate to source voltage. Therefore, current limiting is achieved in this manner for each of the phase portions 305 of the power drive units 60.

In a related matter, in the circuitry of FIG. 5 there is included the ability to affect the speed with which the power transistor 260 is turned on or off. Careful selection of the resistance for resistor 365 allows "soft switching" which can reduce undesireable voltage and current spikes in the power output transistors 260 and the stepper motors 95.

A holding current is provided by the constant current source 210 shown in FIG. 3. The stepper motors 95 have winding resistances less than an ohm in each phase, for example, a resistance of about 0.5 ohms and even with the rotary indexer 100 at rest, there is one power transistor 260 on in each half winding of each of the stepper motors 95. This effect is a consequence of using the optoisolator 170 in series with the resistance 300 to sense the control signals from the programmable controller 40. The holding torque current is in effect a low voltage D.C. supply followed by a shared constant current source 370. A shared diode 375 allows the holding current to be fed to the two half windings of the stepper motor 95 having the power transistors 260 on. This holding torque current feature assures the current level in each of the stepper motors 95 is maintained, regardless of variations in motor winding resistance when heating occurs. When the shared high voltage supply 230 is on, the shared diode 375 is reverse biased; and the holding current is blocked or not generated.

Relative selected alignment of each of the plurality of rotary indexers 100 is accomplished by rotary local jog means, such as an alignment component 400. The alignment component 400 generates an alignment signal to its associated power drive unit 60 which causes only its stepper motor 95 to rotate clockwise or counterclockwise during initial set up. The alignment component 400 enables the selective alignment of any one of the rotary indexers 100 relative to the others. Using conventional gear mechanisms one can readily attain rotational adjustability of about 1.5 minutes of arc. For example, one might choose to achieve substantially parallel alignment of a plurality of fixtures, such as alignment of a flat surface of a truncated sphere acting as a fixture to accept a component for machining. The operator can first roughly align all the fixtures and then perform, selectively, a final alignment with each of the alignment components 400 to achieve the desired final alignment. This alignment will allow carrying out the same machining and/or positioning function for all the sequentially connected, or electronically chained, stepper motors 95 using only the one programmable controller 40 generating one control signal.

In general an incremental jog means can be utilized to generate some local incremental spatial movement through the stepper motor 95, such as translation, rotation or a combination thereof. This element can constitute a translational indexer 403 in addition to, or in place of the rotary indexer 100 in FIG. 1. Conventional mechanical implementation can be used to accomplish the translational movement responsive to adjustment of the translation indexer 403.

Figure 7:
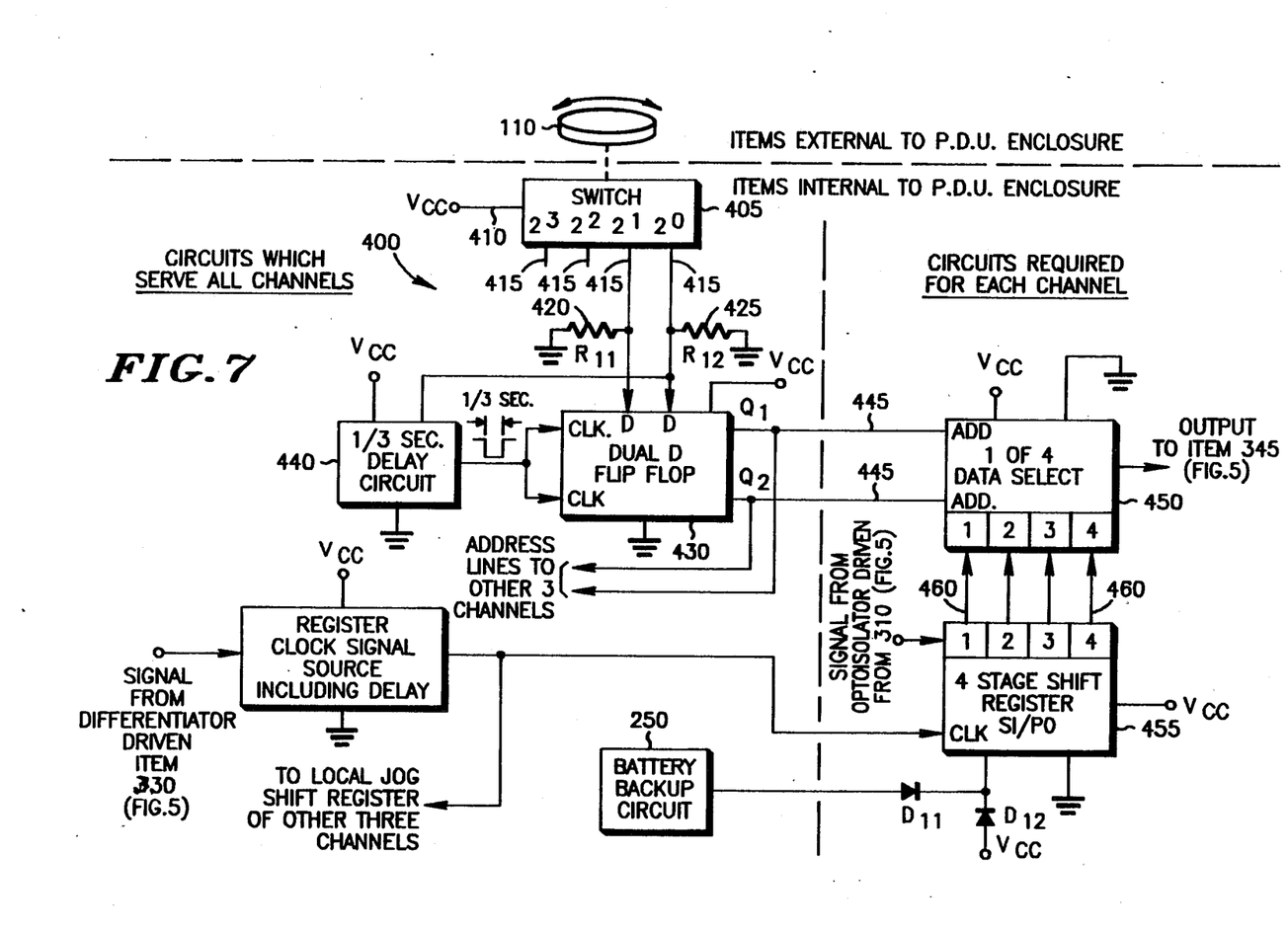
FIG. 7 is a circuit diagram of a rotary local jog component.

A preferred form of the alignment component 400 for accomplishing the example local rotary jog is illustrated in FIG. 7. Only one of the four phase portions 305 is shown with the other three being identical. Referring to FIG. 5, the alignment component 400 is inserted at the location denoted "LJ" between the inverter 310 and the gate 345. The switch used for the local jog is a binary coded rotary switch 405 shown in FIG. 7. The rotary switch 405 has sixteen positions, a mechanical detent every 22.5 degrees of arc and one input pin 410 to which voltage $V_{cc}$ is applied and four output pins 415 associated with two raised to zero power through two raised to the third power. Depending on the switch position, each of the output pins 415 provides voltage $V_{cc}$ or provides an open circuit. Resistors 420 and 425 convert the open circuit to ground ("0" state) signals. The output of the rotary switch 405 then becomes binary numbers 0–15 as it is rotated and these numbers are expressed in the following Table 1:

| Binary | | | | Decimal | Binary | | | | Decimal | Binary | | | | Decimal | Binary | | | | Decimal |
|---|---|---|---|---|---|---|---|---|---|---|---|---|---|---|---|---|---|---|---|
| $2^3$ | $2^2$ | $2^1$ | $2^0$ | — | $2^3$ | $2^2$ | $2^1$ | $2^0$ | — | $2^3$ | $2^2$ | $2^1$ | $2^0$ | — | $2^3$ | $2^2$ | $2^1$ | $2^0$ | — |
| 0 | 0 | 0 | 0 | 0 | 0 | 1 | 0 | 0 | 4 | 1 | 0 | 0 | 0 | 8 | 1 | 1 | 0 | 0 | 12 |
| 0 | 0 | 0 | 1 | 1 | 0 | 1 | 0 | 1 | 5 | 1 | 0 | 0 | 1 | 9 | 1 | 1 | 0 | 1 | 13 |
| 0 | 0 | 1 | 0 | 2 | 0 | 1 | 1 | 0 | 6 | 1 | 0 | 1 | 0 | 10 | 1 | 1 | 1 | 0 | 14 |
| 0 | 0 | 1 | 1 | 3 | 0 | 1 | 1 | 1 | 7 | 1 | 0 | 1 | 1 | 11 | 1 | 1 | 1 | 1 | 15 |

This rotary switch 405 has no mechanical stops and can be rotated continuously, either clockwise or counterclockwise using the alignment component 110 (switch knob). The stepper motor 95 performs all rotations using repetitions sequences of just four unique combinations of "0" or "1" (off/on) conditions for the power transistors. Consequently, there is a need to store only four bits of information in order to implement any local jog function. Examining Table 1, it should be noted that the two least significant bits repeatedly cycle from binary zero through binary three as the switch knob is rotated clockwise, or the reverse if the knob is rotated counterclockwise. Furthermore, the least significant bit at the right changes state for each and every incremental movement of the knob of the rotary switch 405. Consequently, the repetitive cycling from binary zero through binary three allows sequential addressing of four bits of stored data. Further, the change of state for the least significant bit provides a flag which indicates that a change has been made, and the circuit can effectively block out ambiguous data which exists while the switch is being turned from one binary position to the next.

Referring again to FIG. 7, the two least significant output lines 415 are used to provide output information to the "D" inputs of dual "D-type" flip-flops 430. The flip-flops 430 receive input information which is not transferred to their outputs until a clock pulse is received at clock terminals 435. This allows the one-third of a second delay circuit 440 to sense a change of state on the least significant switch output and initiates a one-third second negative going pulse to the clock terminals 435 of each of the two shared flip-flops 430. The data is then transferred to the output terminals 445 one-third a second later when the rotary switch 405 is safely detented at the new position. The delay circuit 440 also provides an immediate clock signal on power up in order to establish the existing position of the rotary switch 405. In this fashion one of the addressable states in a one of four data selector 450 is chosen simultaneously on all four channels. Consequently, by rotating the knob of the rotary switch 405 by one position at a time, the data selector output will "walk up" or "down" the data which is presented at the inputs 460.

In order to input data to this local jog circuitry of FIG. 7, as indicated hereinbefore, the circuit is inserted at position "LJ" in FIG. 5. Consequently, the four stage shift registers 455 are driven from the inverter 310 in FIG. 5 which in turn is driven by the optoisolator 170. The output from the local jog circuit which is output from the one of four data selector 450 is fed back into the gate 345.

The local jog circuit 400 in FIG. 7 includes the shift register 455 which is initialized by powering up the system in a movement of four or more steps in the intended direction of drive rotation. This can be accomplished for all of the power drive units 60 simultaneously either by a command from the programmable controller 40 or by the use of the controller jog switch 212 described hereinbefore (see FIG. 1). This movement will initially load the stages of the four stage shift register 455 with a correct sequence of on/off states. As described previously this enables the subsequent use of the local jog function for each of the power drive units 60 to accomplish precise individual alignments. The shift register 455 will also remember the last four states of this and all subsequent motions, but the fifth pervious state will be pushed out of each register and lost. However, as indicated hereinbefore, there are only four unique combinations of these states so they will always be retained in the registers and in the proper sequence for addressing in the data selector 450. The four stage shift registers 455 receive clock signals from the output of the gate 330, identified as LJ timing in FIG. 5. This signal is delayed briefly to accommodate register set-up time requirements.

The inventions have been described with respect to preferred embodiments, but it will be apparent to those skilled in the art that changes and modifications may be made without departing from the scope of the invention in its broader aspects. Accordingly, it is intended that all matter contained in the above description, or shown in the accompanying drawings shall be interpreted in illustrative and not limiting senses.

What is claimed:

1. A system for controlling a plurality of stepper motors, comprising:
   control means for generating a control signal; and
   a plurality of drive signal means responsive to said control signal for generating a drive signal, said control means coupled to a first one of said plurality of drive signal means and additional ones of said drive signal means sequentially connected to said first one of said drive signal means, enabling input of substantially the same said control signal to each of said plurality of drive signal means being operatively coupled to an associated one of said stepper motors.

2. The system as defined in claim 1 further including incremental means for generating an alignment signal to an associated one of said drive signal means, said alignment signal stepping each associated one of said stepper motors a predetermined amount.

3. The system as defined in claim 1 further including means for selectively enabling or disabling each of said drive signal means.

4. The system as defined in claim 3 wherein said enabling/disabling means comprises a power on/off switch coupled to an associated one of said drive signal means.

5. The system as defined in claim 1 wherein said control means comprises a microprocessor.

6. A machining/positioning apparatus for controlled execution of a plurality of substantially identical machining and/or positioning tasks, using a plurality of selected indexers, comprising:
   input means for providing program signals responsive to an input;

control means responsive to said program signals for generating control signals;

a plurality of drive signal means responsive to said control signals for generating electrical drive signals, said control means coupled to a first one of said plurality of drive signal means and additional ones of said drive signal means, enabling input of substantially the same said control signal to each of said plurality of drive signal means;

motor means responsive to said electrical drive signal for generating powered movement to perform said machining and/or positioning; and indexer means responsive to said powered movement for effecting a measurable selected spatial movement during said machining and/or positioning.

7. A method for controlling the execution of a plurality of substantially identical tasks using a plurality of drive signal components coupled to a selected indexer, comprising the steps of:

providing a program signal responsive to an input;

generating control signals responsive to said program signals;

generating electrical drive signals responsive to said control signals;

outputting said electrical drive signals to a first drive signal component and subsequently outputting said electrical drive signals sequentially to others of said drive signal components;

moving each said selected indexer responsive to said electrical drive signals;

effecting a measurable selected spatial movement of said selected indexer; and outputting index signals indicating the beginning and end of each said task.

8. The system as defined in claim 1 wherein said control means and said drive signal means are adapted for portable use.

9. A power drive unit for providing electrical drive signals to a stepper motor responsive to control signals from a programmable controller, comprising:

means responsive to said reduced current level control signals for limiting the current level of said drive signals during the acceleration and deceleration of said stepper motor; and holding torque current means for providing a holding torque current to keep said stepper motor at the angular position associated with said control signals from said programmable controller upon decelerating said stepper motor to stop at the angular position associated with said drive signals.

10. The power drive unit as defined in claim 9 wherein said optoisolator circuit means comprises an optoisolator and a coupled predetermined resistance.

11. The power drive unit as defined in claim 9 wherein said means for limiting the current level of said drive signals comprises a power transistor circuit.

12. The power drive unit as defined in claim 9 wherein said holding torque current means comprises means responsive to sensing said reduced current level control signals for actuating a high voltage switch and a constant current circuit source means for providing a holding current responsive to deactivation of said high voltage switch.

13. The power drive unit as defined in claim 12 wherein said constant current circuit source means comprises a constant current source and a diode.

14. A system for controlling a plurality of stepper motors, comprising:

control means for generating a control signal;

a plurality of drive signals means responsive to said control signal for generating a drive signal, said control means coupled to a first one of said plurality of drive signal means and additional ones of said drive signal means sequentially connected to said first one enabling input of substantially the same said control signal to each of said plurality of drive signal means; and incremental jog means for generating an alignment signal to an associated one of said drive signal means, said alignment signal stepping each associated one of said stepper motors a predetermined amount, said incremental means comprising a binary coded switch having a plurality of selectable positions.

15. The system as defined in claim 14 wherein said plurality of selectable positions includes two least significant bits adapted for repeated sequential addressing between binary zero and binary three as said switch is rotated in one direction.

16. The system as defined in claim 14 wherein the first significant binary bit of said binary coded switch undergoes a change of state between each position of said switch, detection of said change of state enabling rejection of improper data present during the turning of said switch from one position to the next.

17. The system as defined in claim 9 further including incremental means for generating an alignment signal to an asssociated one of said drive signal means, said alignment signal stepping each associated one of said stepper motors a predetermined amount, said incremental means in communication with said optoisolator circuit means.

18. The system as defined in claim 14 wherein said incremental means further comprises a memory element associated with each of the windings of said stepper motors, each said memory element initialized responsive to said control signals and the data within each said memory element being output by a data selector responsive to address bits from said binary coded switch.

19. The system as defined in claim 18 wherein said memory element comprises a shift register.

20. The system as defined in claim 1 wherein said drive signal means is adapted to operate using low electrical levels for said control signals, enabling the driving of a large number of said drive signal means.

21. A system for controlling a plurality of stepper motors, comprising:

control means for generating a control signal; and a plurality of drive signal means, responsive to said control signal input directly from said control means, for generating a drive signal, said control means coupled to a first one of said plurality of drive signal means and additional ones of said drive signal means sequentially connected to said first one of said drive signal means, enabling input of substantially the same said control signal to each of said plurality of drive signal means being operatively coupled to an associated one of said stepper motors and said plurality of stepper motors responsive substantially immediately to said drive signal, allowing substantially simultaneous motion of said stepper motors.

* * * * *